Patented Mar. 11, 1952

2,588,393

UNITED STATES PATENT OFFICE 2,588,393

ORGANOSILOXANE COATING COMPOSITION CONTAINING METHYLHYDROGENSILOXANE FLUID AND DIMETHYLPOLYSILOXANE HIGH POLYMER

Toivo A. Kauppi, Midland, Mich., assignor to Dow Corning Corporation, Midland, Mich., a corporation of Michigan No Drawing. Application March 27, 1950, Serial No. 152,260

5 Claims. (Cl. 260—18)

The present invention relates to film-forming organosiloxane compositions and to methods for their preparation. It is particularly concerned with organosiloxane compositions which form tough, flexible, tack-free, water-repellent films.

It is known that dimethylpolysiloxane high polymers may be cured at elevated temperatures, both with and without catalysts, to a gel-like state. If the curing is carried on to the extent that a non-tacky condition is reached, and if no fillers have been added prior to said curing, the resulting gels are soft, crumbly, and largely devoid of physical strength. Films so formed which are of polymolecular thickness are worthless.

Although organosiloxane resins, as compared to organic resins, are noted for their superior electrical insulation properties such as dielectric strength, power factor, wet insulation resistance, arc resistance, and thermal stability, a need has existed for a film-forming material of improved surface resistivity characteristics.

The dimethylpolysiloxanes have the desired surface resistivity characteristics, but valuable films are not produced for the reasons above noted. For these reasons, dimethylpolysiloxane has been employed as a coating only as a monomolecular layer.

Objects of this invention are to provide improved film-forming organosiloxane compositions, to provide an organosiloxane film of improved physical characteristics, and to provide compositions which air dry to a tack-free state.

Other objects and advantages will be apparent from the following description.

It has been found that a mixture comprised of a soluble dimethylpolysiloxane high polymer and a methylhydrogensiloxane fluid has the completely unexpected property of readily forming a tough, flexible, tack-free film. This mixture may be employed as a coating material and may be applied either as such or in solution. The coating may be cured to a tack-free state by contact with air.

Dimethylpolysiloxane high polymers are well known to the art. For the most efficient practice of this invention they should be substantially free of $Me_3SiO_{1/2}$ and $MeSiO_{3/2}$ units. The dimethylpolysiloxane employed is characterized by solubility in benzene. This solubility is indicative of substantial freedom from cross-linkage. Further, these polymers have a plasticity number of at least 30. This "plasticity number" is expressed in thousandths of an inch, and is determined by a modification of ASTM–D926–47T, in which the modification is that 4.2 grams of material are used rather than the specified 2 cc. The test is conducted over a three minute period at 25° C. The lower plasticity number of 30 corresponds approximately to a penetrometer reading (ASTM–D217–44T) of 370 expressed in tenths of a milimeter in ten seconds at 25° C.

Dimethylpolysiloxane polymers are preferred which have a plasticity number less than 110. However, those having a plasticity number of more than 110 may be used, as long as they are substantially soluble in an organic solvent such as benzene.

These soluble dimethylpolysiloxane high polymers may best be prepared by contacting completely condensed cyclodimethylsiloxanes with alkali metal alkoxides, as set forth in detail in the copending application of E. L. Warrick, Serial No. 95,375, assigned to the same assignee as the present invention. Other types of catalysts may be used to prepare similar high polymers, as is known in the art. These include acids, alkali metal hydroxides and peroxides, alkali metal salts of organosilanols, and heavy metal salts such as $FeCl_3$.

The methylhydrogenpolysiloxane fluids employed are fluids in which the repeating unit—$CH_3HSiO$—is found. They may be cyclics or linear polymers end-blocked with trimethylsiloxy or dimethylhydrogensiloxy units. These fluids have the general formula

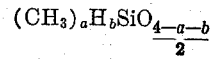

$$(CH_3)_a H_b SiO_{\frac{4-a-b}{2}}$$

in which $a$ has a value of from 1.0 to 1.5, $b$ has a value of from 0.75 to 1.25, and the sum of $a$ and $b$ has a value of from 2.0 to 2.25 inclusive. They may contain traces of hydroxy radicals due to incomplete condensation. Such fluids are well known to the art.

The preferred method of mixing the dimethylpolysiloxane high polymers with the methylhydrogensiloxane fluid consists in preparing a solution of the dimethylpolysiloxane high polymer in an appropriate solvent and adding a methylhydrogensiloxane fluid to this solution. However, if the application is to be such that a solvent-free mixture is preferred, the mixing may be carried out by any appropriate method such as milling or the use of any mechanical mixer.

A multitude of organic solvents may be used in this mixing operation, the only requirement being that they dissolve the dimethylpolysiloxane high polymer. The choice of a solvent therefore depends upon the article to be treated, the drying time desired, and the safety factors involved.

Thus it may be seen that aliphatic and aromatic hydrocarbons, chlorinated hydrocarbons, ethers, ketones, petroleum ethers, napthas, and the like may be used in this process, the choice merely depending upon the application, availability, and price. A preferred solvent for many applications is methylenedichloride, which allows fast evaporation and fast curing, is non-inflammable, and has no bad toxicological properties. Methylenedichloride, however, should not be used when the mixture is to be applied to articles protected with lacquers which would be sensitive to this solvent. Petroleum ethers, which offer almost the same drying rate as obtained with methylenedichloride, do not attack most lacquers but do have low flash points.

The amount of solvent used is dependent on the desired viscosity of the final solution, and the thickness desired in the film to be produced. For maximum efficiency, minimum bubbling, and a film of five to ten mils in thickness, it is preferable to use a 15 to 35 per cent solution based on total organosilicon content.

It is preferred to employ from 0.6 to 1.5 parts of methylhydrogensiloxane fluid per part of dimethylsiloxane high polymer. Thus, based on the over-all organosiloxane content, the product contains from about 38 to 62 per cent by weight of the methylhydrogensiloxane fluid and from about 62 to 38 per cent by weight of the dimethylpolysiloxane high polymer on a solvent free basis. Solutions containing a lower ratio of methylhydrogensiloxane fluid become progressively more difficult to cure to a tack-free state. Solutions containing a higher ratio become progressively more brittle after curing.

The product is cured by contact with air. The rate of cure may be increased by heating or by use of a catalyst. It has been found that a mixture such as that described may be cured at temperatures above 100° C. to a tack-free condition. It is often advantageous, however, to incorporate a catalyst into the above mixture in order to accelerate the curing rate. For instance, it has been found that with the proper choice of a catalyst, the mixture can be air-dried to a tack-free state without resorting to elevated temperatures. This allows the application of the product to objects which could not withstand elevated temperatures.

A wide choice of such catalysts is available, since any metal salt of a carboxylic acid is applicable. The lead, iron, and zinc salts of carboxylic acids are preferred, particularly the hexoates, octoates, oleates, stearates, naphthenates, laurates, and resinates. It has been found that the well known dryers and siccatives of the paint and varnish industries are applicable to the process of the present invention. The copper, aluminum, manganese, cadmium, cobalt, and nickel salts of carboxylic acids have been found effective, but slower than the lead, iron and zinc catalysts. Basic materials such as metal hydroxides and amines may be employed as well as metal nitrates and acetates, but these are not as satisfactory.

In order to produce a mixture which air-dries to a tack-free state, the catalyst should be present in an amount equal to about from 1 to 5 per cent by weight, based on the metal constituent and the weight of organosiloxane portion of the solution. If heating of the treated object is possible or desirable, less catalyst may be used. The catalyst is preferably added in the form of a solution in the selected solvent, just prior to use.

The products of this invention are particularly adaptable to the treatment of electronic equipment of all kinds to reduce electrical leakage and failure due to conditions of high humidity. Radio, television, and radar sets; and amplifying and communication equipment in general, may be treated in whole or in part, either before or after assembly. The heat curing requirements of prior organosilicon resins made most such applications impractical prior to this invention. Ignition systems and electrical coils in motors, generators, transformers, etc. are protected from loss in insulation resistance by these products, and when applied to asbestos arc-chutes in circuit breakers, the loss in insulation resistance caused by water absorption of the asbestos is abated and carbon tracking eliminated.

The films formed by the process of this invention are adherent to ceramics such as glass, porcelain, and steatite; to varnished surfaces, phenol-formaldehyde and other plastics; and to mica, metallic surfaces, and cellulosic materials. The cured film is tack-free, tough, flexible even at temperatures down to −75° C., and water-repellent. Its surface resistivity characteristics, and resistance to change in such characteristics after months of exposure at very high relative humidities, are much better than previously known film-forming compositions.

The following examples describe specific embodiments of the invention, but are not to be construed as limiting the scope thereof. All parts given are by weight.

*Example 1*

Twenty-five parts of a dimethylpolysiloxane high polymer, having a plasticity number of 51, were dissolved in 150 parts of methylene dichloride. 25 parts of a trimethylsiloxane end-blocked methylhydrogensiloxane fluid were added, making the solution 25 per cent by weight of organosilicon compounds. Glass microscope slides were dipped in this solution and cured at temperatures of from 150° C. to 250° C. It was found that a tough, flexible, tack-free film was produced in 6 hours at 150° C. Less than 10 minutes were required to reach this condition at 250° C.

*Example 2*

Twenty-five parts of a dimethylpolysiloxane high polymer, having a plasticity number of 51, were dissolved in 150 parts of methylene dichloride. 25 parts of a trimethylsiloxy end-blocked methylhydrogensiloxane fluid were added, making the solution 25 per cent by weight of organosiloxane compounds. To this solution was added 2.5 parts of lead 2-ethyl hexoate dissolved in 22.5 parts of methylene dichloride. A glass microscope slide was dipped in the catalyzed solution, and in 2 hours at 20° C. a tough tack-free film was formed thereon. This film was held at a temperature of −75° C. for a period of two weeks, and was found to maintain its flexibility at that temperature.

*Example 3*

Using the procedure and materials of Example 2, a solution was made of 60 per cent of dimethylpolysiloxane high polymer and 40 per cent of methylhydrogensiloxane fluid. The solution air-dried in 3 hours, but to a softer film of a little less physical strength than the film from Example 2.

*Example 4*

Using the procedure and materials of Example 2, a solution was made of 40 per cent of dimethylpolysiloxane high polymer and 60 per cent of methylhydrogensiloxane fluid. The solution air-dried in 2 hours, forming a tack-free film with a little less flexibility than that found in the film from Example 2.

*Example 5*

Using a dimethylpolysiloxane high polymer with a plasticity number of 82, a solution was made in naptha in which the ratio of gum to methylhydrogensiloxane fluid was 1.0. The solution was diluted to 25 per cent by weight of total organosilicon content and lead 2-ethyl hexoate added in an amount to give 2 per cent lead based on the organosilicon components. A deep section of the catalyzed solution was air-dried in an aluminum foil cup, giving a 45 mil bubble-free film which was tough and flexible.

*Example 6*

Using the procedure of Example 2, a series of solutions was made in which the catalyst concentration was varied from 0.1 to 10 per cent by weight of the metal based on the weight of the organosilicon components. A multitude of various metallic salts of carboxy acids were tested in this series, such as hexoates, octoates, oleates, stearates, naphthenates, laurates, resinates, and acetates in which the metallic component was lead, iron, zinc, copper, aluminum, manganese, cadmium, cobalt, nickel, calcium, or mercury. It was found that the lead salts were by far the most effective in producing air-drying tack-free films. The remainder of the metallic salts promote the formation of tack-free films, but require a longer time to do so. It was found that decreasing the catalyst concentration to below about 0.5 per cent also lengthens the curing time required. On the other hand, increasing the catalyst concentration to above 7.0 per cent is undesirable, for in most instances the catalyst fails to remain completely in solution at the higher concentrations, fails to materially reduce the curing time, and has a tendency to both discolor the film and make it somewhat brittle upon thermal aging.

*Example 7*

A number of 40 mil films were cast from the catalyzed solution of Example 2. These films were then exposed to a relatively humidity of 96 per cent at 25° C., in a controlled humidity chamber. The surface resistivity was measured on these films, using concentric electrodes in accordance with the method of ASTM-D257-49T, the resistance being measured by a 500 volt D. C. megohm bridge. The measurments were made without removing the films from the controlled humidity chamber. After 96 hours at 96 per cent relative humidity, a surface unit resistivity of greater than $10^{10}$ ohms was found. After 60 days under the test conditions, no change in surface restivity could be detected.

That which is claimed is:

1. An organosiloxane composition comprising a mixture of 38 to 62 per cent (based on siloxane content) by weight of a methylhydrogensiloxane fluid of the general formula $$(CH_3)_a H_b SiO_{\frac{4-a-b}{2}}$$

in which $a$ has a value of from 1.0 to 1.5, $b$ has a value of from 0.75 to 1.25, and the sum of $a$ and $b$ has a value of from 2.0 to 2.25; and from 62 to 38 per cent (based on siloxane content) by weight of a dimethylpolysiloxane high polymer which is soluble in benzene and which has a plasticity number greater than 30 expressed in thousandths of an inch, said plasticity number being determined upon a 4.2 gram test sample at 25° C. with a 3 minute duration of load in accordance with ASTM-D926-47T.

2. An organosiloxane composition comprising a mixture of 38 to 62 per cent (based on siloxane content) by weight of a methylhydrogensiloxane fluid of the general formula $$(CH_3)_a H_b SiO_{\frac{4-a-b}{2}}$$

in which $a$ has a value of from 1.0 to 1.5, $b$ has a value of from 0.75 to 1.25, and the sum of $a$ and $b$ has a value of from 2.0 to 2.25; from 62 to 38 per cent (based on siloxane content) by weight of a dimethylpolysiloxane high polymer which is soluble in benzene and which has a plasticity number greater than 30 expressed in thousandths of an inch, said plasticity number being determined upon a 4.2 gram test sample at 25° C. with a 3 minute duration of load in accordance with ASTM-D926-47T; and a metallic salt of a carboxylic acid.

3. The composition of claim 2 wherein the metallic salt is selected from the group consisting of lead and zinc carboxylates containing from 6 to 18 carbon atoms.

4. The method of forming a tack-free film upon an article of manufacture, which comprises coating said article with an organosiloxane composition comprised of a mixture of from 38 to 62 per cent (based on siloxane content) by weight of a methylhydrogensiloxane fluid of the general formula $$(CH_3)_a H_b SiO_{\frac{4-a-b}{2}}$$

in which $a$ has a value of from 1.0 to 1.5, $b$ has a value of from 0.75 to 1.25, and the sum of $a$ and $b$ has a value of from 2.0 to 2.25; and from 62 to 38 per cent (based on siloxane content) by weight of a dimethylpolysiloxane high polymer which is soluble in benzene and which has a plasticity number greater than 30 expressed in thousandths of an inch, said plasticity number being determined upon a 4.2 gram test sample at 25° C. with a 3 minute duration of load in accordance with ASTM-D926-47T; and curing the siloxane coating to a tack-free state by contacting it with oxygen.

5. The method of claim 4 in which the composition includes a metal salt of a carboxylic acid, whereby the curing occurs by air-drying the coating.

TOIVO A. KAUPPI.

REFERENCES CITED

The following references are of record in the file of this patent:

UNITED STATES PATENTS

| Number | Name | Date |
|---|---|---|
| 2,386,259 | Norton | Oct. 9, 1945 |
| 2,442,196 | Coggeshall | May 25, 1948 |
| 2,448,556 | Sprung et al. | Sept. 7, 1948 |

OTHER REFERENCES

Amer. Soc. for Testing Materials, 1949 Book of ASTM Standards, part 6, 1950, pp. 1156 to 1158.